United States Patent [19]

Hufford

[11] Patent Number: 4,662,668
[45] Date of Patent: May 5, 1987

[54] MATERIAL HANDLING SENSOR DEVICE AND METHOD

[76] Inventor: Donald L. Hufford, Rte. 3, Box 374C, Charlevoix, Mich. 49720

[21] Appl. No.: 817,070

[22] Filed: Jan. 8, 1986

[51] Int. Cl.⁴ .................................................. B25J 15/06
[52] U.S. Cl. .................................. 294/64.1; 294/907; 414/737
[58] Field of Search ........................ 294/64.1, 65, 907; 414/416, 627, 744 B; 271/90, 108, 103, 265

[56] References Cited

U.S. PATENT DOCUMENTS

| | | |
|---|---|---|
| 3,901,502 | 8/1975 | Vits ..................................... 294/64.1 |
| 3,957,296 | 5/1976 | Langguth . |
| 3,970,341 | 7/1976 | Glanemann et al. . |
| 4,006,929 | 2/1977 | Barker . |
| 4,121,865 | 10/1978 | Littwin, Sr. . |
| 4,266,905 | 5/1981 | Birk et al. .......................... 294/64.1 |
| 4,451,197 | 5/1984 | Lange . |
| 4,548,396 | 10/1985 | Nelen . |

FOREIGN PATENT DOCUMENTS 2511921  10/1981  France ................. 294/64.1

*Primary Examiner*—James B. Marbert
*Attorney, Agent, or Firm*—Price, Heneveld, Cooper, DeWitt & Litton

[57] ABSTRACT

A material handling sensor device that includes a proximity sensor located within a vacuum cup. A raised surface in the vacuum cup maintains the proper spacing between the proximity sensor and the handled object, and a seal is formed integrally with the vaccum cup.

29 Claims, 6 Drawing Figures

MATERIAL HANDLING SENSOR DEVICE AND METHOD

BACKGROUND OF THE INVENTION

The present invention relates to sensors used to determine if material handling equipment has successfully engaged and retained a handled object, and in particular to sensors of the proximity sensor-type.

Developments in the material handling field have produced a wide variety of material handling equipment that is either partially or wholly automated. This equipment utilizes a wide variety of mechanisms for engaging and retaining the object to be handled, the particular retention mechanism often being dictated by the configuration and type of material to be handled. Conventional material handling equipment may utilize gripping or clamping jaws, or vacuum cups or the like which are mounted on a bracket or arm that is moved into engagement with the handled piece. Although such material handling equipment typically successfully engages and retains the handled object, occasionally such automated devices fail in either retaining the handled object or by retaining more than one object. Although infrequent, such failures can result in failures in subsequent process steps and result in substantial costs for correcting the failure, employee and equipment down time, and material waste.

In order to avoid failures of the type noted above, a variety of sensors have been used in conjunction with material handling devices to determine if the handling device has successfully engaged and retained the handled object. One type of sensor that has been used for this purpose are photoelectric detectors which require a visual path in order to determine the successful retention of an object. A different type of sensor used with such handling devices are proximity sensors. Proximity sensors utilize a magnetic or other electric field in order to determine if an object is proximate to the sensor. In some instances proximity sensors can additionally perform counting functions to determine if too many objects have been retained. Although these proximity sensors function adequately if operated within the sensor parameters, such proximity sensors typically must be positioned very closely adjacent the handled object in order to obtain a correct reading. The tolerances on the positioning of such sensors are very close and often difficult to maintain. Slight variations, such as occur with a mispositioned mounting bracket can result simply through the routine use of the material handling equipment itself. An improper registry of the sensor results in erroneous error signals by the sensor, which may also lead to any of the aforementioned waste and costs.

SUMMARY OF THE INVENTION

The present invention provides for the proper registry between a proximity sensor and an object to be handled, such as in a material handling operation. In the preferred embodiment, the proximity sensor is mounted within a vacuum cup. The vacuum cup and sensor are positioned adjacent the handled object and a vacuum is applied around the sensor in order to correctly index the sensor with the handled object. A raised lip on the inner surface of the vacuum cup provides a means for maintaining the proper spacing between the detecting end of the sensor and the handled object. In one preferred embodiment the proximity sensor is a counting proximity sensor that determines the number of handled objects when a vacuum is applied about the sensor.

DETAILED DESCRIPTION OF THE PREFERRED EMBODIMENT

Figure 1:
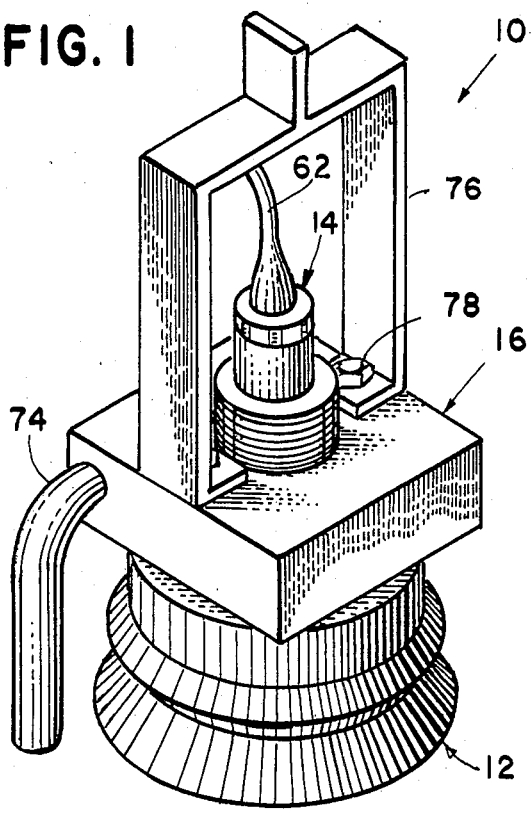
FIG. 1 is a fragmentary, perspective view of a material handling sensor device embodying the present invention.

The invention is embodied in a material handling sensor device and method, a preferred embodiment of which is shown in FIG. 1 and referenced generally by the numeral 10. Sensor device 10 includes a vacuum cup 12 in which a sensor 14 is mounted. Vacuum cup 12 and proximity sensor 14 are mounted on an adaptor or mounting block 16. A seal 18 (Fig. 2) formed integrally with vacuum cup 12 extends around proximity sensor 14 in order to provide an air tight seal thereabout. Mounting block 16 moves vacuum cup 12 into abutment with the object to be handled and a vacuum is applied about proximity sensor 14. Vacuum cup 12 maintains proper registry between proximity sensor 14 and the handled object in order to permit proximity sensor 14 to obtain an accurate reading.

Figure 2:
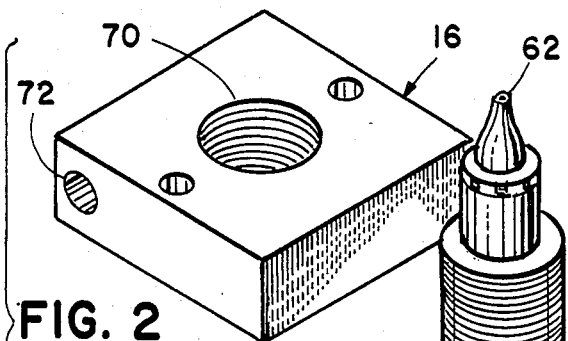
FIG. 2 is an exploded view of the sensor device of FIG. 1.
Figure 3:
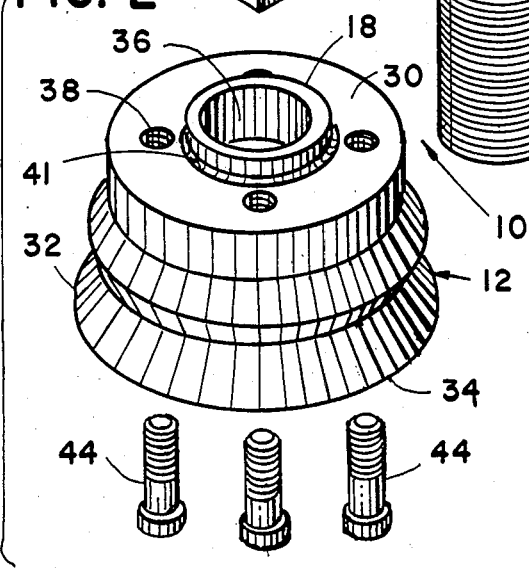
FIG. 3 is an elevational, sectional view taken along plane III—III of FIG. 4.
Figure 3:
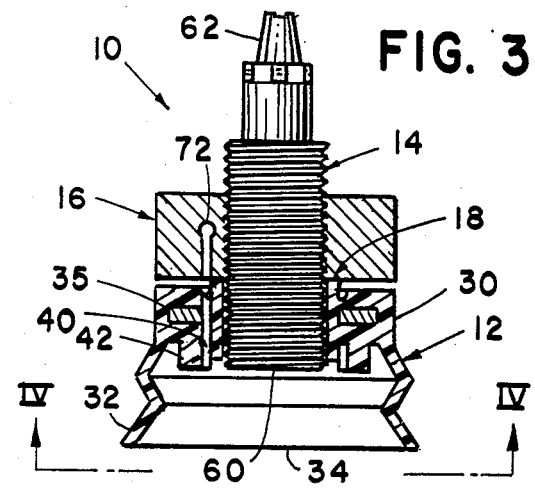

As shown in FIGS. 2 and 3, vacuum cup 12 has an at least semi-rigid back panel 30 with a pleated or bellows-type skirt 32. Vacuum cup 12 has an engaging end 34 opposite back panel 30 that contacts the handled object. Back panel 30 includes an aluminum reinforcing ring 35 about which an elastomeric material is molded to form skirt 32 integrally with back panel 30. Skirt 32 is therefore a resilient, elastomeric element that conforms to the handled object in order to create an air tight seal between the circumference of engaging end 34 and the handled object. Through the center of back ring 30 is a central aperture 36 through which proximity sensor 14 is received. Four mounting bolt apertures 38 are radially spaced around aperture 36 and are used in securing vacuum cup 12 to mounting block 16. Alternatively skirt 32 may be a straight-sided or angled configuration without a series of pleats.

A vacuum port 40 (FIGS. 3, 4) forms a channel through back panel 30 to the inside of vacuum cup 12. An annular groove or recess 41 (FIG. 2) extends around seal 18 and central aperture 36. Vacuum port 40 opens into recess 41, so that when vacuum cup 12 is secured to mounting block 16 recess 41 forms a circular channel. A continuation of port 40 extends up into mounting block 16 which also opens into recess 41 when sensor device 10 is assembled. Vacuum cup 12 and mounting block 16 may therefore be rotated relative to one another and the sections of vacuum port 40 will align with recess 41 regardless of such relative rotation.

Seal 18 is a raised annular lip about central aperture 36 that is formed integrally with back panel 30. Seal 18 is formed from a resilient elastomeric material that compresses when vacuum cup 12 is secured to mounting block 16. When mounting block 16 and vacuum cup 12 are forced together, seal 18 is forced into the threads of proximity sensor 14 in order to form an air tight seal about the circumference of proximity sensor 14. Preferably, seal 18 and the remainder of vacuum cup 12 are molded from a neoprene material, although alternative elastomeric materials may suitably be used. Although back panel 30 and mounting block 16 are shown in FIG. 3 as being spaced by seal 18, this is for purposes of showing the location of seal 18 only. When assembled, seal 18 does not substantially space back panel 30 and mounting block 16.

Alternatively, in another preferred form seal 18 is a triangular or angled raised lip that angles upwardly toward central aperture 36. The angled lip 18 is thus forced toward central aperture 36 as vacuum cup 12 and mounting block 16 are brought together, thus forcing angled lip seal 18 into the threads of proximity sensor 14.

Figure 4:
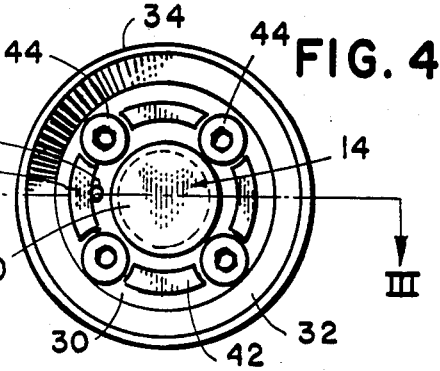
FIG. 4 is a bottom plan view of the sensor device of FIG. 1.

On the inner surface of back ring 30 is a raised lip or land 42 (FIG. 3). Lip 42 extends in a circle around proximity sensor 14 (FIG. 4). Lip 42 protrudes from back ring 30 a slight distance further than the protruding end of proximity sensor 14 and has a flat contact surface. Lip 42 provides a means for maintaining the spacing between proximity sensor 14 and the handled object when a vacuum is applied within vacuum cup 12. When a vacuum is applied by sensor device 10, skirt 32 resiliently collapses until the handled object contacts lip 42 and thus maintains proper registry with proximity sensor 14. As best shown in FIG. 4, lip 42 is broken to provide for the seating of four mounting bolts 44. The elastomeric layer over reinforcing ring 35 is also recessed in the area about bolt apertures 38 on the inner surface of back panel ring 30. Bolts 44 are received through bolt apertures 38 and into mounting block 16. Reinforcing ring 35 is exposed in the region about bolt apertures 38 so that bolts 44 seat against reinforcing ring 35 which provides a rigid anchor for the heads of bolts 44. Lip 42 protrudes from back ring 30 a distance greater than the heads of bolts 44 in order to provide a resilient contact surface for the handled object. Alternatively, the rigidity of skirt 32 provides a means for maintaining the registry between proximity sensor 14 and the handled object.

Prior conventional vacuum cups have included a broken raised lip to separate the handled object from the inner surface of the vacuum cup. In these prior cups the separating lip has been used to permit the applied vacuum to operate across the face of the vacuum cup, rather than simply across the vacuum outlet into the cup which would occur if the handled object were pressed flat against the vacuum outlet. Although in sensor device 10, lip 42 broken by bolts 44 does provide the function of spreading the vacuum across vacuum cup 12, lip 42 performs the additional spacing or registry function for proximity sensor 14 discussed above.

Proximity sensor 14 is a cartridge-type sensor having a threaded cylindrical body that extends through mounting blocks 16 and back ring 30. A detecting end 60 protrudes through back ring 30 in order to be positioned adjacent the plane of lip 42 within vacuum cup 12. Typically detecting end 60 is offset slightly from the plane of lip 42 in order to remain out of contact with the handled object. This distance is typically several thousandths of an inch, although certain proximity sensors may alternatively be positioned flush with the plane of lip 42 in order to contact the handled object. Electrical leads 62 extend from the end of proximity sensor 14 opposite detecting end 60. Leads 62 are operably connected to a control system of conventional design that selectively activates proximity sensor 14 and displays an appropriate signal upon determination that an object is positioned adjacent detecting end 60.

One suitable type of proximity switch is manufactured by NAMCO Controls, of 7567 Tyler Boulevard, Mentor, Ohio 44060, and distributed under the trade name ET 100 SERIES SENSORS. Another suitable proximity switch is manufactured by Syron Engineering of Ann Arbor, Michigan. This switch is a counting switch that utilizes a magnetic field to determine the number of objects that have been picked up in a material handling operation. Sensor device 10 may be provided with a counting proximity sensor to determine if a material handling failure has occurred by picking up too many objects.

Mounting block 16 is preferably a square aluminum block having a central aperture 70 through which proximity sensor 14 is received. Central aperture 70 is threaded to correspond with threaded housing of proximity sensor 14. On the underside of mounting block 16 are four threaded bores (not shown) that receive the ends of mounting bolts 44. A venturi 72 is formed by a tapering passage that extends through the sides of mounting block 16. At the narrowed center region of venturi 72, the venturi is in air flow communication with vacuum port 40 which extends down through the undersurface of block 16. A flexible air supply line 74 is coupled to either side of mounting block 16 on venturi 72. Air supply line 74 and venturi 72 provide a means for applying a vacuum within vacuum cup 12 by evacuating vacuum cup 12 through vacuum port 40. An appropriate air flow supply source is coupled to air supply line 74, such as a conventional compressor or other appropriate vacuum source.

Alternatively, in a preferred form circular recess 41 is included on the surface of mounting block 16 instead of on vacuum cup 12. Circular recess 41 thus extends about threaded aperture 70 on the face of mounting block 16 that contacts back ring 30. Circular recess 41 thus permits relative rotation between vacuum cup 12 and mounting block 16 with air flow through port 40.

A support bracket 76 is coupled to mounting block 16 by bolts 78. Support bracket 76 can have a variety of configurations dependent upon the type of material handling equipment that sensor device 10 is to be used in conjunction with. Support bracket 76 is mounted on the material handling engagement mechanism, whether that mechanism is an arm having clamping jaws, vacuum cups or the like. Support bracket 76 positions sensor device 10 so that vacuum cup 12 contacts the handled object as the gripping mechanism is moved into a retention position. Alternatively, support bracket 76 is independently mounted and manipulated by the material handling device to be maneuvered into position with vacuum cup 12 abutting the handled object.

Figure 5:
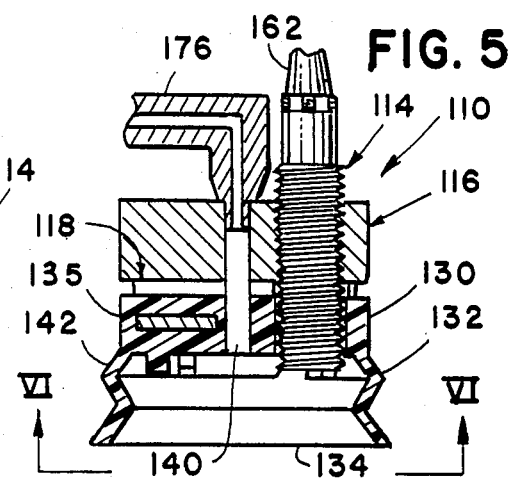
FIG. 5 is a sectional, elevational view of a sensor device forming a second preferred embodiment of the invention.
Figure 6:
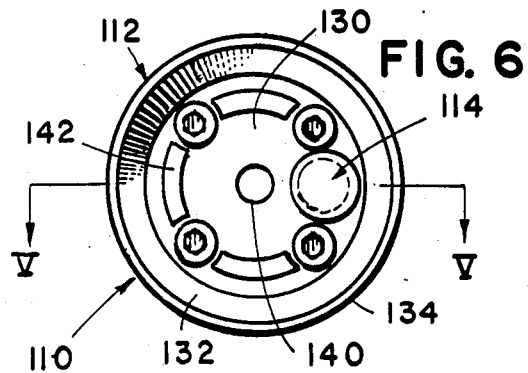
FIG. 6 is a bottom plan view of the sensor device of FIG. 5.

Another preferred embodiment is shown in FIGS. 5 and 6 and referenced generally by the numeral 110. Sensor device 110 is generally similar to sensor device 10 described above, so that similar features have been given similar reference numerals with the prefix one hundred, with the exception of those features noted below. Sensor device 110 includes a vacuum cup 112, a proximity sensor 114 and a mounting block 116. Vacuum cup 112 includes a back ring 130 with a skirt 132 and engaging end 134. A vacuum port 140 extends up through the center of vacuum cup 112, and a lip 142 extends in a circle about central vacuum port 140 inside of cup 112.

In sensor device 110, proximity sensor 114 is offset from the center of vacuum cup 112. A separate seal element 118 is positioned between vacuum cup 112 and mounting block 116 to be compressed therebetween. An alternative mounting bracket 176 is coupled at the center of mounting block 116. Mounting bracket 176 includes a right angle bend with a central channel that is in air communication with vacuum port 140. Alternatively, bracket 176 may be provided with a venturi similar to venturi 72 described above, in order to induce a vacuum within vacuum cup 112. Sensor device 110 operates in a manner similar to that of sensor device 10 described above. Vacuum cup 112 is brought into abutment with the handled object with engaging end 134 contacting the surface of the handled object. A vacuum is applied about the detecting end of proximity sensor 114 so that the handled object is drawn into abutment with raised lip 142. Proximity sensor 114 determines whether the handled object has been successfully retained by the material handling mechanism as the mechanism moves the handled object.

It is to be understood that the above is merely a description of the preferred embodiment and that one skilled in the art will recognize that various modifications or improvements may be made without departing from the spirit of the invention disclosed herein. The scope of protection afforded is to be determined by the claims which follow and the breadth of interpretation that the law allows.

The embodiment of the invention in which an exclusive property or privilege is claimed are defined as follows:

1. A material handling sensor device, comprising:
   a vacuum cup having a material engaging end defining an aperture therethrough;
   means for applying a vacuum to said vacuum cup;
   a proximity sensor having a detecting end with means for sensing the presence of an object proximate thereto, said proximity sensor detecting end disposed within said vacuum cup; and
   means for maintaining proper registry and spacing said proximity sensor detecting end from an object in contact with said vacuum cup engaging end when a vacuum is applied to said vacuum cup.

2. The sensor device of claim 1, wherein:
   said registry and spacing maintaining means is a raised surface inside of said vacuum cup positioned to abut an object in contact with said vacuum cup engaging end when said vacuum is activated.

3. The sensor device of claim 2, wherein:
   said proximity sensor is a counting proximity sensor having means for sensing if more than one object is held proximate said proximity sensor detecting end.

4. The sensor device of claim 3, wherein:
   said raised surface is a generally circular ring extending about said proximity sensor detecting end.

5. The sensor of claim 2, wherein said vacuum cup has resiliently deformable sides, whereby when said vacuum is applied said vacuum cup sides deform until said object engages said raised surface.

6. The sensor device of claim 1, wherein:
   said vacuum cup is secured to a mounting block, said proximity sensor extending through said mounting block; and
   a seal disposed between said mounting block and said vacuum cup, said seal forming a vacuum seal about said proximity sensor.

7. The sensor device of claim 6, wherein said seal is formed integrally with said vacuum cup.

8. The sensor device of claim 7, wherein:
   said registry maintaining means is a raised surface inside of said vacuum cup positioned to abut an object in contact with said vacuum cup engaging end.

9. The sensor device of claim 1, further comprising:
   a mounting block; and
   said vacuum cup and said mounting block each have a vacuum channel therethrough, one of said mounting block and said vacuum cup having a circular recess on a surface contacting the other of said mounting block and said vacuum cup, said vacuum channels both being in air flow communication with said circular recess when said vacuum cup is secured to said mounting block.

10. A material handling sensor device, comprising:
    a vacuum boot having an inner surface and means for applying a vacuum therein;
    a proximity sensor having a detecting end secured to and exposed to the inside of said vacuum boot, said detecting end being a fixed distance from said inner surface; and
    a spacing surface on said vacuum boot and spaced from said detecting end, said spacing surface providing a stop for the material being handled when said vacuum is applied to provide a contact distance for said material being handled relative said detecting end.

11. The proximity sensor of claim 10, wherein:
    said spacing surface is a raised, generally circular ring extending about said proximity sensor detecting end.

12. The sensor device of claim 10, wherein:
    said vacuum boot is secured to a mounting block, said proximity sensor extending through said mounting block; and
    an air impermeable seal member about said proximity sensor.

13. The sensor device of claim 12, wherein:
    said seal is integrally formed with said vacuum cup.

14. The sensor device of claim 10, wherein:
    said vacuum boot is resiliently collapsible, whereby when said vacuum is applied said vacuum boot collapses until the handled material contacts said spacing surface.

15. The sensor device of claim 10, further comprising:
    a mounting block; and
    said vacuum cup and said mounting block each have a vacuum channel therethrough, one of said mounting block and said vacuum cup having a circular recess on a surface contacting the other of said mounting block and said vacuum cup, said vacuum channels both being in air flow communication with said circular recess when said vacuum cup is secured to said mounting block.

16. A material handling sensor device, comprising:
    a vacuum cup having a material engaging end defining an aperture therethrough;
    means for applying a vacuum to said vacuum cup;

a proximity sensor having a detecting end with means for sensing the presence of an object proximate thereto, said proximity sensor detecting end disposed within said vacuum cup, said proximity sensor being a counting proximity sensor having means for sensing if more than one object is held proximate said proximity sensor detecting end; and means for maintaining proper registry between said proximity sensor detecting end and an object in contact with said vacuum cup engaging end when a vacuum is applied to said vacuum cup.

17. The sensor device of claim 16, wherein:

said registry maintaining means is a raised surface inside of said vacuum cup positioned to abut an object in contact with said vacuum cup engaging end when said vacuum is activated.

18. The sensor device of claim 16, further comprising:

a mounting block; and said vacuum cup and said mounting block each have a vacuum channel therethrough, one of said mounting block and said vacuum cup having a circular recess on a surface contacting the other of said mounting block and said vacuum cup, said vacuum channels both being in air flow communication with said circular recess when said vacuum cup is secured to said mounting block.

19. A method of detecting the presence of an object to be handled in a material handling operation, said method comprising:

providing a vacuum cup having a field generating proximity sensor disposed therein;

bringing said vacuum cup into engagement with the object to be handled;

applying a vacuum about said field generating proximity sensor to selectively secure said field generating proximity sensor to the handled object; and sensing the presence of the handled object in engagement with said vacuum cup with a field generated by said field generating proximity sensor.

20. The method of claim 19, further comprising:

spacing said field generating proximity sensor from the handled object.

21. The method of claim 20, wherein:

said spacing step includes providing a raised spacing surface within said vacuum cup so as to abut the handled object when said field generating proximity sensor is selectively secured thereto.

22. The method of claim 19, further comprising:

counting the number of objects proximate said vacuum cup.

23. A material handling sensor device, comprising:

a vacuum cup having a material engaging end defining an aperture therethrough;

means for applying a vacuum to said vacuum cup;

a field generating proximity sensor having a detecting end with means for sensing the presence of an object proximate thereto by use of said field, said proximity sensor detecting end disposed within said vacuum cup; and means for maintaining proper field sensing registry between said proximity sensor detecting end and an object in contact with said vacuum cup engaging end when a vacuum is applied to said vacuum cup.

24. The sensor device of claim 23, wherein:

said field generating proximity sensor is a counting proximity sensor having means for sensing if more than one object is held proximate said proximity sensor detecting end.

25. The sensor device of claim 23, wherein:

said vacuum cup is secured to a mounting block, said field generating proximity sensor extending through said mounting block; and a seal disposed between said mounting block and said vacuum cup, said seal forming a vacuum seal about said field generating proximity sensor.

26. The sensor device of claim 23, further comprising:

a mounting block; and said vacuum cup and said mounting block each have a vacuum channel therethrough, one of said mounting block and said vacuum cup having a circular recess on a surface contacting the other of said mounting block and said vacuum cup, said vacuum channels both being in air flow communication with said circular recess when said vacuum cup is secured to said mounting block.

27. The sensor device of claim 26, wherein:

said registry maintaining means is a raised surface inside of said vacuum cup positioned to abut an object in contact with said vacuum cup engaging end when said vacuum is activated.

28. The sensor device of claim 23, wherein:

said registry maintaining means is a raised surface inside of said vacuum cup positioned to abut an object in contact with said vacuum cup engaging end when said vacuum is activated.

29. The sensor device of claim 28, wherein:

said raised surface is a generally circular ring extending about said proximity sensor detecting end.

* * * * *